United States Patent [19]

Brunsch et al.

[11] 4,372,795
[45] Feb. 8, 1983

[54] METHOD FOR THE MANUFACTURE OF A COUPLING OR CLUTCH ELEMENT

[75] Inventors: Klaus Brunsch, Weidach; Claus-Michael Herkert, Zorneding; Dieter Thomamueller, Bruckmuehl, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 308,776

[22] Filed: Oct. 5, 1981

[30] Foreign Application Priority Data

Oct. 31, 1980 [DE] Fed. Rep. of Germany ....... 3041064

[51] Int. Cl.³ .............................................. B32B 31/04
[52] U.S. Cl. .................................... 156/155; 156/173; 156/242; 156/245
[58] Field of Search ................. 156/81, 173, 155, 242, 156/245; 74/DIG. 10; 428/65, 67, 99, 223, 290

[56] References Cited

U.S. PATENT DOCUMENTS 2,744,043  5/1956  Ramberg ............................. 156/173
3,654,009  4/1972  Judd et al. ........................... 156/173
4,118,528 10/1978  Lowry ................................... 428/65

Primary Examiner—Caleb Weston
Attorney, Agent, or Firm—W. G. Fasse; D. H. Kane, Jr.

[57] ABSTRACT

A coupling or clutch type element for connecting a driving member to a driven member, in a universal manner allowing for axial and/or angular displacements between the two members, is made by laminating sheets cut from preimpregnated fiber compound webbings onto a subsequently removable core. The sheets are placed in consecutive, overlapping layers with a predetermined fiber orientation. The initial tackiness holds the blanks and layers of sheets together. The assembly of laminates is less compressed in a mold and cured which provides the required bonding and operational strength. After removing the coupling element from the mold the core is removed, for example, by melting or washing. The resulting product does not require any subsequent machining.

7 Claims, 7 Drawing Figures

| LAYER NO. | NUMBER PRECUT BLANKS | FIBER ORIENTATION |
|---|---|---|
| 1 | 48 | ±45° |
| $2_1$ | 2 | ±45° |
| $2_2$ | 2 | 0°/90° |
| $2_3$ | 2 | ±45° |
| $2_4$ | 2 | 0°/90° |
| $2_5$ | 2 | ±45° |
| 3 | 4 | 0°/90° |
| 4 | 2 | ±45° |
| 5 | 2 | ±45° |
| 6 | 2 | 0°/90° |

METHOD FOR THE MANUFACTURE OF A COUPLING OR CLUTCH ELEMENT

CROSS-REFERENCE TO RELATED APPLICATION:

The present invention is based on German Patent application Ser. No. P 3,041,064.1, filed in the Federal Republic of Germany on Oct. 31, 1980. The priority of said German filing date is hereby claimed.

BACKGROUND OF THE INVENTION

Coupling or clutching elements of the prior art, especially the so-called disc clutches or Bendix clutches, are assembled to comprise a plurality of separate elements which remain separated. These elements possess a considerably large weight, thereby causing increased demands, for example regarding the strength of the housings, connecting elements, and mountings. Besides, all of these known arrangements are not corrosion-resistant without additional treatment.

Furthermore, a composite fiber clutching or coupling element has become known through the German Patent application Ser. No. 2,927,955 which however, causes difficulties in its production if a flange, etc. is to be attached to such a coupling element.

OBJECTS OF THE INVENTION

In view of the above it is the aim of the invention to achieve the following objects singly or in combination:

to produce a substantially maintenance-free, lightweight and corrosion-resistant clutching or coupling element;

to provide a clutch or coupling element which, in addition to transmitting torque, also allows a compensation of angular and axial displacements between torsion bars or shafts connected to the element; and to facilitate the manufacture of such elements.

SUMMARY OF THE INVENTION

According to the invention a coupling or clutch element of a composite or compound fiber material is manufactured by the following steps. First an element core for the separate layers of fiber compound material is made of a low melting point metal alloy or other suitable material. Then specially formed or cut prepreg-sections or sheets of fiber compound material of varying dimensions are laminated onto the core whereby the fiber orientations correspond to the requirements of the particular clutch or coupling element.

Connecting members are incorporated into the structure, for example when making the core. The lamination units are then assembled, pressed and cured. The last step involves removing the core, for example by melting. This sequence of steps yields the finished element without any further after-treatment.

BRIEF FIGURE DESCRIPTION

In order that the invention may be clearly understood, it will now be described, by way of example, with reference to the accompanying drawings, wherein.

Figure 4:
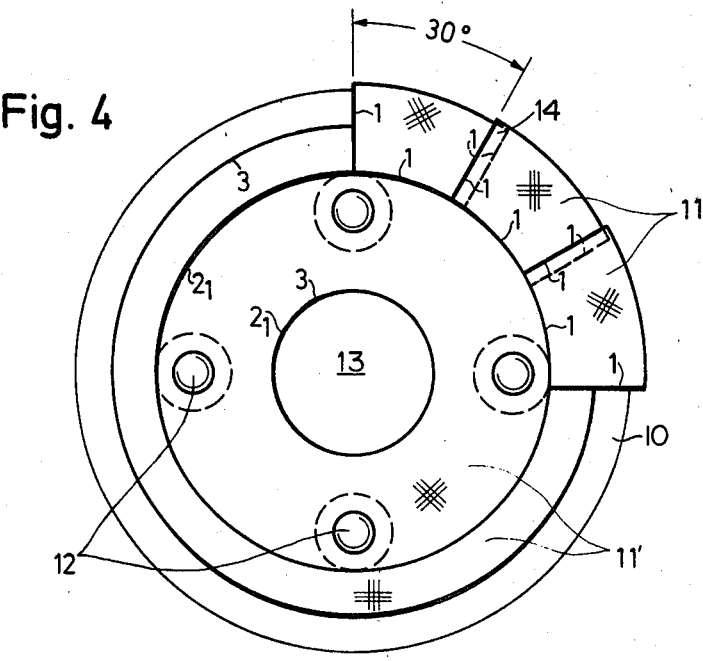
FIG. 4 shows a top plan view illustrating the sequence of production of the coupling element, whereby several precut prepreg sheets have already been placed on the core for the innermost layers 3, $2_1$, and partially 1; corresponding to FIG. 3.
Figure 5:
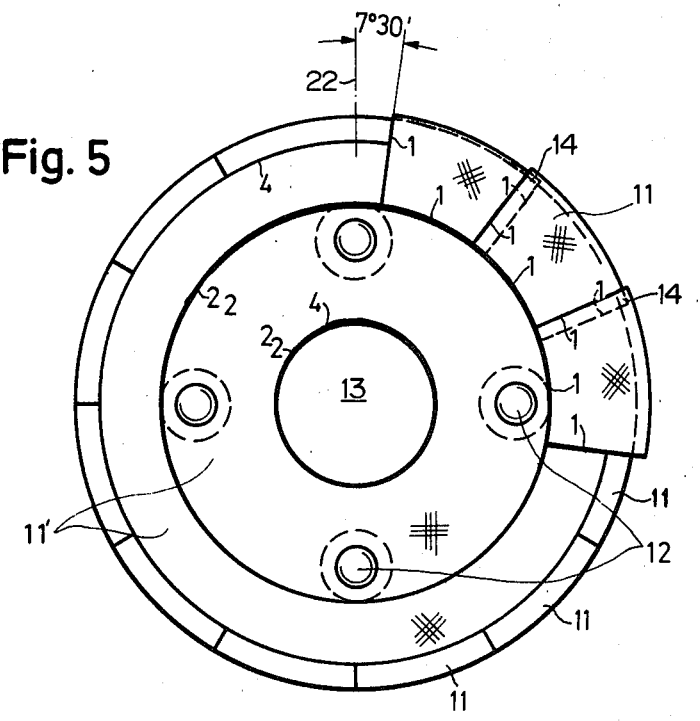
Figures 6, 7:
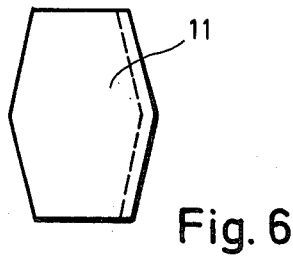

FIG. 5 shows a top plan view onto the element shown in FIG. 4 after the completed placing of the first layers 3, $2_1$, and 1 with the second layer components displaced by 7°30′ from the first layers 1;

FIG. 6 shows a top plan view onto a precut prepreg blank for the layer 1; and

FIG. 7 shows a table listing all individual layers or laminations, the number of individual precut prepreg sheets in each layer, and the corresponding fiber orientation in each layer.

Figure 1:
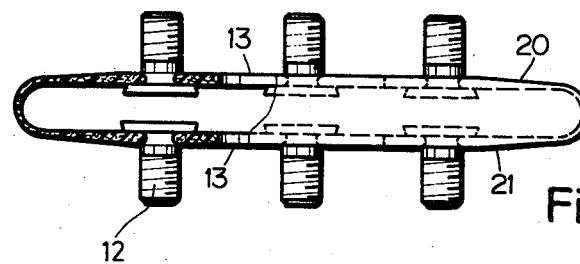
FIG. 1 shows a side view partially in section of the finished coupling or clutch element with the connecting members integrated or incorporated in the element.
Figure 2:
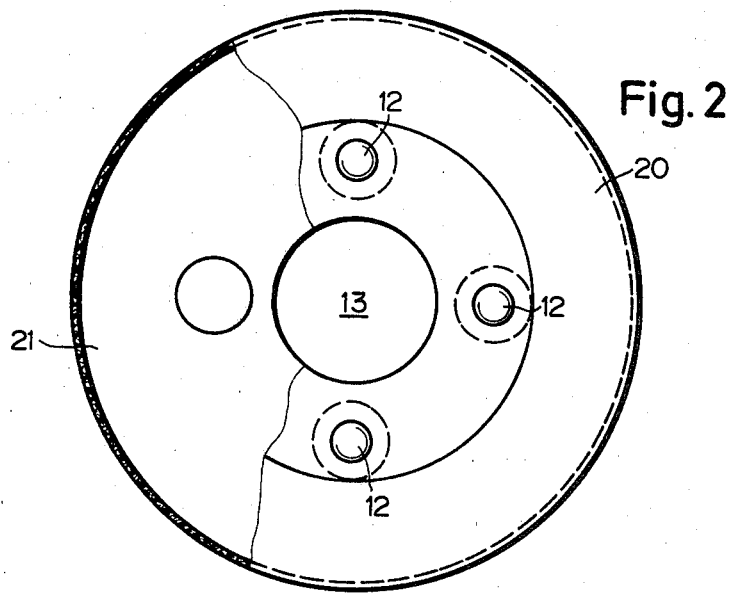
FIG. 2 shows a top plan view of the element of FIG. 1 partially in section.

DETAILED DESCRIPTION OF PREFERRED EXAMPLE EMBODIMENTS AND OF THE BEST MODE OF THE INVENTION:

FIGS. 1 and 2 show the finished clutch or coupling element with the connecting members 12 incorporated into both sides 20 and 21 of the finished coupling element. The finished element is hollow and has a central hole 13 for the removal of a core 10 to be described below. The essentials of the intended manufacturing sequence of the coupling element shown in FIGS. 1 and 2, are illustrated in FIGS. 3 to 6. The first processing step involves the production of a core 10 onto which the individual layers are laminated. The core 10 is cast of a low melting point metal or metal alloy in a special, although simple, casting tool. The metal or alloy is chosen so as to make certain that the melting or liquefying temperature of the metal or alloy is below the temperature which would affect the cured composite or compound fiber material. An alloy suitable for this purpose may be selected, for example, from the cerro alloys.

Instead of making the core 10 of the aforementioned metal alloys, the core may also be made of a eutectic salt or a synthetic product which may be washed out, such as polyvinyl alcohol (PVA). The connection members 12 for the transmission of torque are fixed in or held in position temporarily by this core during this casting procedure of the core 10. However, the connecting members 12 are not removed with the core 10 because the connecting members are bonded to the coupling element during its formation as a result of the curing of the fiber compound material.

In addition to the casting operation, so-called prepreg sheets 11 or sections of a composite or compound fiber material are cut with the aid of a template or are punched or stamped out with a cutting tool or mold. The shape of the cutout sheets 11 for radially outer layers 1 is shown in FIG. 6. The sheets 11′ for the various layers 2, 3, 4, 5, and 6 have a ring shape and are not separately shown. These blanks 11, 11′ are laid onto the laminating core 10 in rows forming a stack in the sequence shown in FIG. 3 starting with the innermost ring layers 3 directly adjacent to the core 10, and in a partially overlapping manner as shown in FIGS. 3, 4 and 5.

FIGS. 4 and 5 show that the starting points of the layers of sheets 11, starting at the vertical axis line, are angularly displaced relative to each other. Therefore, in FIG. 5, the start of the second inner layer 1 of sheets 11 is displaced from the vertical axis 22 and the edge of first sheet of layer 1 (FIG. 4) by 7°30', the next layer is displaced, for example by 15°, the next by 22°30', and so on. Each individual layer is laminated onto the core 10 with the cutout sheets 11, 11'.

Figure 3:
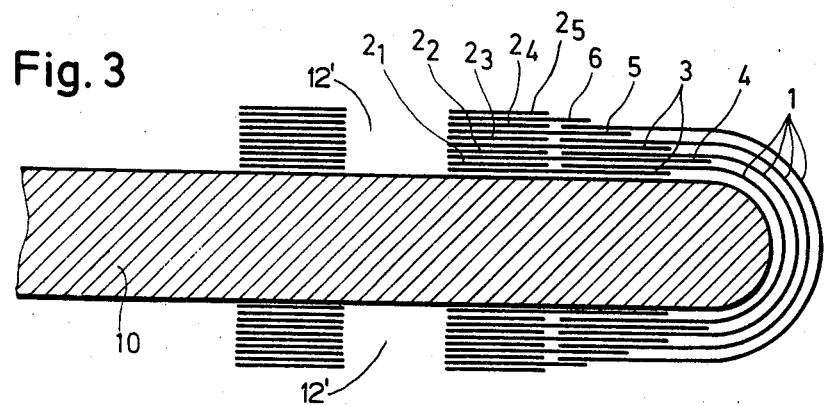
FIG. 3 shows a schematic section through the layers of the assembled separate or individual components.

FIG. 3 shows the order of the lamination steps as well as the arrangement of the layers 1, $2_1$, $2_2$, $2_3$, $2_4$, $2_5$, 3, 4, 5, and 6. FIG. 5 also shows the overlapping 14 of the several layers relative to one another. The overlapping 14 extends in the circumferential or angular direction around the central rotational axis. The blanks 11, 11' also overlap in the radial direction as best seen in FIG. 3. The connecting members 12 incorporated into the coupling element are not shown in FIG. 3 to provide a less cluttered, clearer view. However, the holes 12' are in reality filled with the connecting members 12.

The table of layers listed in FIG. 7 shows for the described example embodiment the corresponding fiber orientation in the cutout sheets 11, 11' in the several layers 1, $2_1$, $2_2$, $2_3$, $2_4$, $2_5$, 3, 4, 5, and 6. The table also shows the number of cutout sheets 11, 11' laminated onto the core 10 to form the coupling element.

The so stacked set of laminations of sheets 11, 11' is now pressed and cured in a special tool, not shown, whereby the curing temperature is to be held lower than the liquefaction or disintegration or melting temperature of the overal core. After complete curing, the coupling element is taken out of the mold and in a further step the metal of the core 10 is melted out. During this melting the melting temperature must remain below the temperature that would affect the cured fiber compound material. As previously mentioned, the core 10 may also be made of an eutectic salt or a synthetic material which may be washed out. In any event, the core 10 is removed from the finished product through the hole 13 shown in FIGS. 1 and 2.

After the removal from the pressing mold, there exists a finished, immediately usable clutch or coupling element. Therefore, no aftertreatment whatsoever is necessary. This so produced element has a series of considerable advantages as compared to prior art clutch elements. Essential advantages are seen, for example in that the weight has been reduced, the corrosion resistance has been increased and the maintenance-free operation has been quite considerably improved without even the slightest detrimental effects on the necessary mechanical features. As a further essential advantage it should be mentioned that the present clutch element compensates an angular and axial displacement of torsion shafts to which the element is connected. This latter feature is presumably due to the fact that the wall thickness of the element is smaller at its circumference than near its center around the hole 13 as is disclosed in FIGS. 1 and 3. FIG. 3 clearly shows that at the circumference there are four layers 1 and near the center there are ten layers of fiber compound material, for example. Finally, it should be mentioned that the seams or boundaries in clutch elements according to the invention are reduced in number as compared to conventional clutches, whereby a simplified quality assurance is achieved during production. The overlapping laminations of the sheets 11, 11' do not constitute "seams" in this context.

Incidentally, the sheets 11, 11' which are cut out of the so-called preimpregnated layers of fiber compound material, are initially sufficiently tacky, due to the impregnation by a resinous material, to stick to the central core 10 and to each other as the several layers of overlapping blanks are applied to the core. The final bonding between the several layers of blanks 11, 11' is then provided as the result of the curing which also gives the finished coupling element the required operational strength. The tackiness also holds the connection members 12 initially in place until they are bonded to the fiber compound material by the above mentioned curing.

Although the invention has been described with reference to specific example embodiments, it is to be appreciated that it is intended to cover all modifications and equivalents within the scope of the appended claims.

What is claimed is:

1. A method for manufacturing a fiber composite coupling element for interconnecting a driving member to a driven member, comprising the following steps: producing a central core of a low melting or dissolvable material, cutting sheets having predetermined sizes and configurations from preimpregnated fiber compound material having a given tackiness, forming layers of said sheets on said core by laminating said sheets onto said core with a predetermined fiber orientation in each layer relative to the next layer and in an overlapping relationship from sheet to sheet, said layers forming in combination a laminated assembly, incorporating connecting members (12) into the coupling element by contacting said connecting members with said sheets whereby the tackiness temporarily holds the connecting members in place, compressing the laminated assembly in a mold, curing the compressed assembly, whereby the curing bonds the sheets to one another and to said connecting members, removing the coupling element from the mold, and removing said central core from the finished coupling element without any additional machining.

2. The method of claim 1, wherein said central core is made of a metal or alloy having a melting point sufficiently low for melting the central core out of the finished coupling element without affecting the cured coupling element.

3. The method of claim 1, wherein said central core is made of a eutectic salt which is washed out of the finished coupling element.

4. The method of claim 1, wherein said central core is made of a synthetic material, such as polyvinyl alcohol, which is washed out of the finished coupling element.

5. The method of claim 1, wherein said curing is performed at a temperature lower than the temperature necessary for the removing of the central core from the finished coupling element.

6. The method of claim 1, wherein said connecting members are temporarily held in place by said central core.

7. The method of claim 1, wherein the number of layers placed at the circumference of the coupling element is smaller than the number of layers placed closer to the center of the coupling element.

* * * * *

UNITED STATES PATENT AND TRADEMARK OFFICE
CERTIFICATE OF CORRECTION

PATENT NO. : 4,372,795

DATED : February 8, 1983

INVENTOR(S) : Klaus Brunsch et al

It is certified that error appears in the above-identified patent and that said Letters Patent is hereby corrected as shown below:

On the title page

In [57] ABSTRACT, line 10, replace "less" by --then--.

Signed and Sealed this

Twenty-sixth Day of April 1983

[SEAL]

Attest:

GERALD J. MOSSINGHOFF

Attesting Officer

Commissioner of Patents and Trademarks